US011415962B2

(12) United States Patent
Yamasaki et al.

(10) Patent No.: US 11,415,962 B2
(45) Date of Patent: Aug. 16, 2022

(54) ADDITIVELY-MANUFACTURED OBJECT BY FORMING BEADS ALONG A FORMATION PROJECTED LINE OF BEADS

(71) Applicant: KOBE STEEL, LTD., Hyogo (JP)

(72) Inventors: Takemasa Yamasaki, Hyogo (JP); Tatsuya Fujii, Hyogo (JP); Shinji Sato, Hyogo (JP); Takeshi Yamada, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 50 days.

(21) Appl. No.: 17/050,660

(22) PCT Filed: Apr. 19, 2019

(86) PCT No.: PCT/JP2019/016909
§ 371 (c)(1),
(2) Date: Oct. 26, 2020

(87) PCT Pub. No.: WO2019/220867
PCT Pub. Date: Nov. 21, 2019

(65) Prior Publication Data
US 2021/0080931 A1    Mar. 18, 2021

(30) Foreign Application Priority Data

May 17, 2018  (JP) .............................. JP2018-095769

(51) Int. Cl.
*B33Y 50/02*    (2015.01)
*G05B 19/4099*  (2006.01)
(Continued)

(52) U.S. Cl.
CPC ........ *G05B 19/4099* (2013.01); *B23K 26/342* (2015.10); *B33Y 10/00* (2014.12);
(Continued)

(58) Field of Classification Search
CPC ...................................................... B33Y 50/02
(Continued)

(56) References Cited

U.S. PATENT DOCUMENTS

2009/0142436 A1    6/2009  Kuzusako et al.
2016/0327113 A1*  11/2016  Shelley .................... G02C 5/12
(Continued)

FOREIGN PATENT DOCUMENTS

JP    2019098353 A  *  6/2019  ........... B23K 10/006
WO   2016/149774 A1    9/2016

OTHER PUBLICATIONS

Donghong Ding et al.; "A tool-path generation strategy for wire and arc additive manufacturing"; The International Journal of Advanced Manufacturing Technology; Apr. 11, 2014; pp. 173-183; vol. 73; No. 1-4; London.
(Continued)

*Primary Examiner* — Suresh Suryawanshi
(74) *Attorney, Agent, or Firm* — Studebaker & Brackett PC

(57) ABSTRACT

Using three-dimensional shape data, the shape of a blade, which is an additive manufacturing product, is divided into multiple layers according to the height of a bead. Each layer of the additive manufacturing product that has been divided into multiple layers is divided by fitting regions of a set shape. By determining connecting lines for connecting the divided regions to each other and computing the extension directions of protrusions, planned lines for bead formation along said extension directions are determined. The additive manufacturing product is shaped by forming beads along planned bead formation lines.

7 Claims, 15 Drawing Sheets

(51) Int. Cl.
*B33Y 10/00* (2015.01)
*B23K 26/342* (2014.01)
*B33Y 50/00* (2015.01)
*B23K 5/18* (2006.01)

(52) U.S. Cl.
CPC ............... *B33Y 50/00* (2014.12); *B33Y 50/02* (2014.12); *B23K 5/18* (2013.01); *G05B 2219/49023* (2013.01)

(58) Field of Classification Search
USPC ........................................................ 700/118
See application file for complete search history.

(56) References Cited

U.S. PATENT DOCUMENTS

2019/0249929 A1* 8/2019 Rush .................... F28D 15/046
2021/0147652 A1* 5/2021 Hosoya .................. B32B 15/20

OTHER PUBLICATIONS

The extended European search report issued by the European Patent Office dated Jan. 7, 2022, which corresponds to European Patent Application No. 19803104.9-1103 and is related to U.S. Appl. No. 17/050,660.

\* cited by examiner

FIG. 2
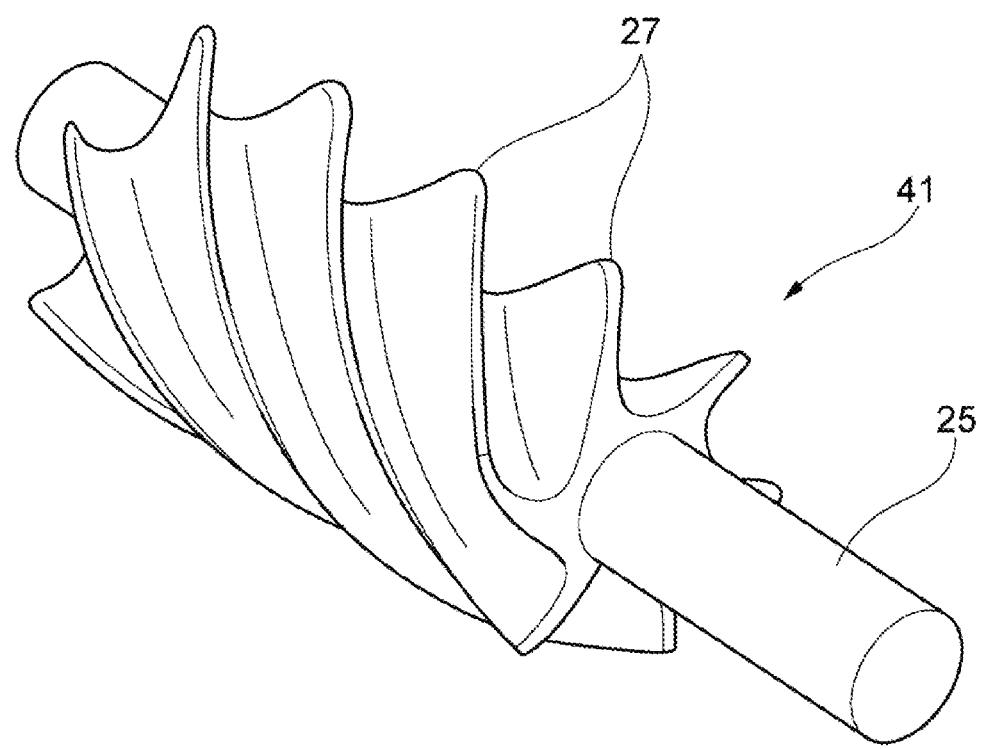
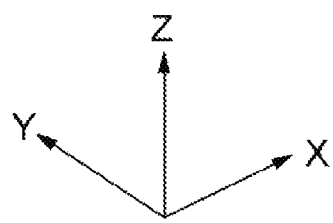

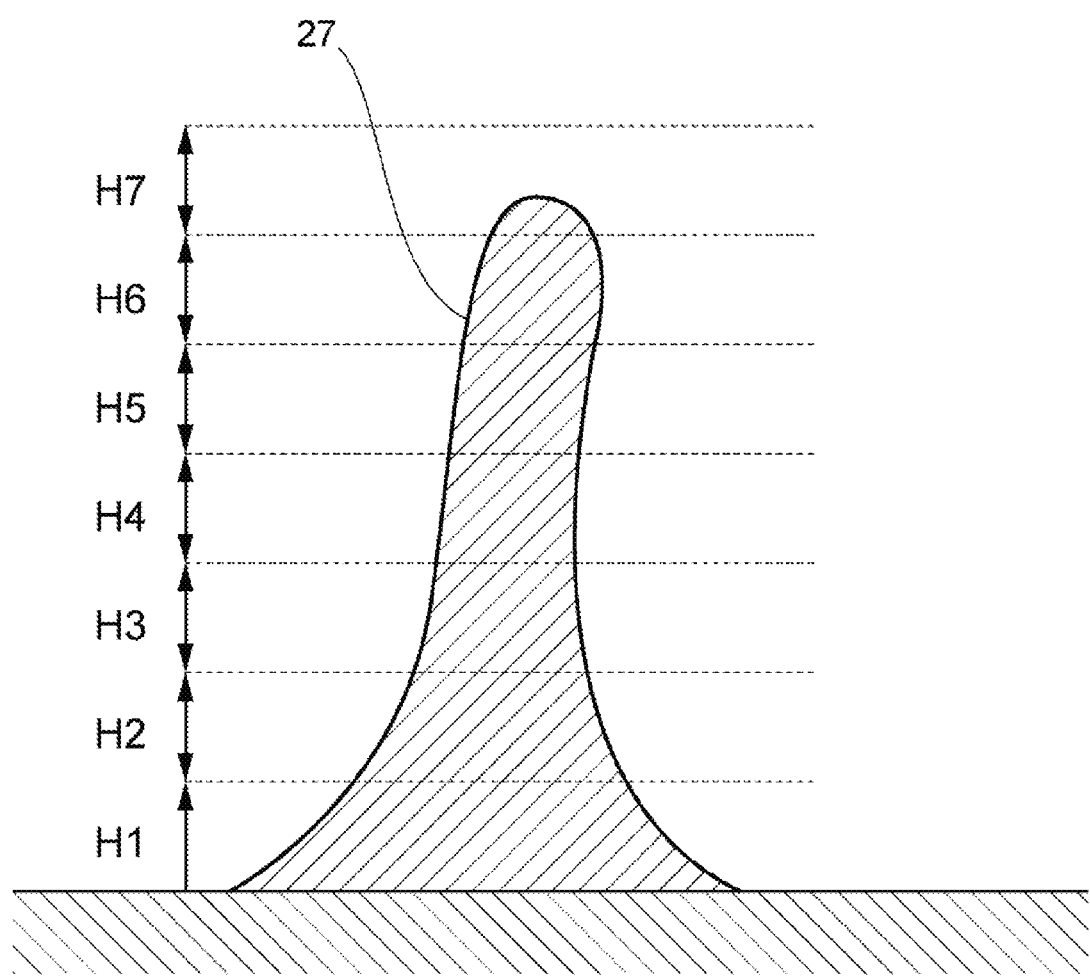

ADDITIVELY-MANUFACTURED OBJECT BY FORMING BEADS ALONG A FORMATION PROJECTED LINE OF BEADS

TECHNICAL FIELD

The present invention relates to a method and an apparatus for manufacturing an additively-manufactured object and a program.

BACKGROUND ART

In recent years, there is a growing need for building using a 3D printer as a production means. Researches and developments have been made toward practical applications of building using a metal material. The 3D printer for building a metal material produces an additively-manufactured object by melting a metal powder or a metal wire by use of a heat source such as a laser, an electron beam or an arc and depositing the molten metal.

For example, as a technique for manufacturing a rotation member such as an impeller or a rotor provided in a fluid machine such as a pump or a compressor, there is a common technique in which a built portion that is to be a plurality of blades is built by depositing beads on a surface of a base material which is a hub, and then the built portion is cut to form a blade (see, for example, Patent Literature 1).

CITATION LIST

Patent Literature

Patent Literature 1: WO 2016/149774 A1

SUMMARY OF INVENTION

Technical Problem

In the case of forming an additively-manufactured portion to be a three-dimensionally curved blade having a complicated shape as described above by beads, if a forming direction of the beads is not appropriately set, a part to be cut increases uselessly when the additively-manufactured portion formed by the beads is subjected to a cut processing, and a yield decreases.

For this reason, it is desired to develop a technique capable of appropriately and easily setting a formation direction when the additively-manufactured portion is formed with the beads to efficiently perform additive manufacturing.

The present invention has been made in view of the above circumstances, and an object thereof is to provide a method and an apparatus for manufacturing an additively-manufactured object capable of appropriately and easily determining a direction of forming a bead to efficiently manufacture the additively-manufactured object, and a program for causing a computer to determine a bead formation order, in building the additively-manufactured object.

Solution to Problem

The present invention includes the following configurations.
(1) A method for manufacturing an additively-manufactured object in which an additively-manufactured object including a protrusion extending in one direction is built by beads formed by melting and solidifying a filler metal, the method including:
a slicing step of slicing a shape of the additively-manufactured object into a plurality of layers depending on a height of the beads by using three-dimensional shape data of the additively-manufactured object;
a surface dividing step of dividing each of the layers into a plurality of regions by applying a region having a preset set shape to each of the sliced layers;
a connection line extracting step of determining a connection line connecting the adjacent regions with each other from one end portion to the other end portion of the protrusion;
an extension direction estimating step of determining an extension direction of the protrusion based on the connection line;
a bead formation line determining step of determining a formation projected line of the beads by dividing the sliced layers into a plurality of the beads along the extension direction; and
a building step of building the additively-manufactured object by forming the beads along the formation projected line of the beads.
(2) An apparatus for manufacturing an additively-manufactured object, including:
a control unit configured to determine a building procedure by the method for manufacturing an additively-manufactured object according to (1); and
a building unit configured to be driven in accordance with the building procedure determined by the control unit to form the beads.
(3) A program for causing a computer to determine a bead formation order in building additively-manufactured object by beads formed by melting and solidifying a filler metal using three-dimensional shape data of the additively-manufactured object including a protrusion extending in one direction, the program including:
a procedure of slicing a shape of the additively-manufactured object into a plurality of layers depending on a height of the beads by using three-dimensional shape data of the additively-manufactured object;
a procedure of dividing each of the layers into a plurality of regions by applying a region having a preset set shape to each of the sliced layers;
a procedure of determining a connection line connecting the adjacent regions from one end portion to the other end portion of the protrusion;
a procedure of determining an extension direction of the protrusion based on the connection line;
a procedure of determining a formation projected line of the beads by dividing the sliced layer into a plurality of the beads along the extension direction; and
a procedure of determining the bead formation order of building the additively-manufactured object by forming the beads along the formation projected line of the beads.

Advantageous Effects of Invention

According to the present invention, it is possible to determine a direction of forming a bead appropriately and easily in building an additively-manufactured object by deposition of beads to efficiently manufacture the additively-manufactured object.

BRIEF DESCRIPTION OF DRAWINGS

FIG. 2 is a perspective view of the additively-manufactured object.

FIG. 9A is a perspective view of the additively-manufactured object, and FIG. 9B is a developed view of the additively-manufactured object.

FIG. 10 is a cross-sectional view taken along a line X-X in FIG. 9B.

DESCRIPTION OF EMBODIMENTS

Figure 1:
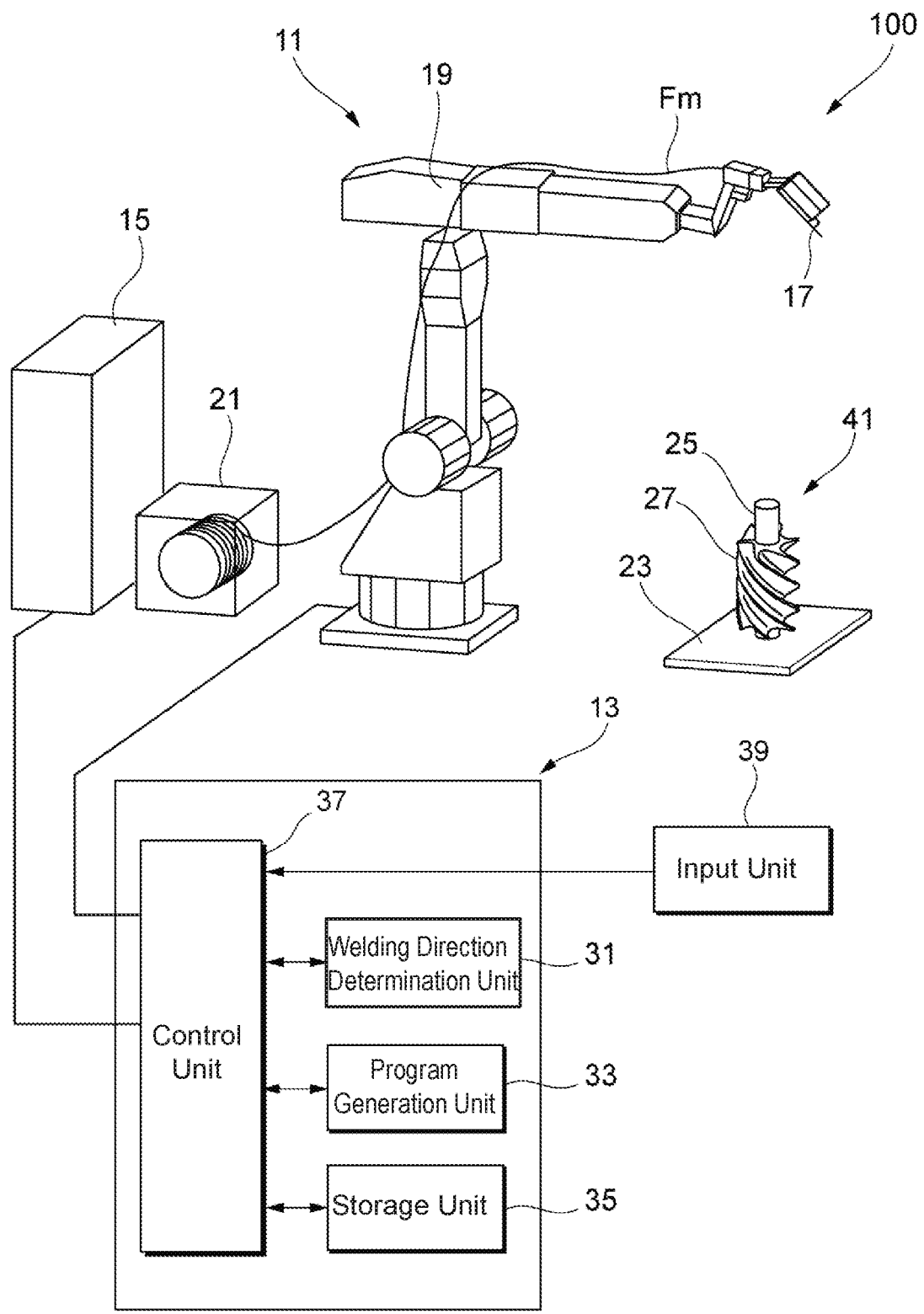
FIG. 1 is a schematic configuration view of a manufacturing apparatus for manufacturing an additively-manufactured object of the present invention.

Embodiments of the present invention will be described in detail below by referring to the drawings.

FIG. 1 is a schematic configuration view of a manufacturing apparatus for manufacturing an additively-manufactured object in the present invention.

A manufacturing apparatus 100 for the additively-manufactured object having the configuration includes a building unit 11, a building controller 13 for collectively controlling the building unit 11, and a power supply device 15.

The building unit 11 includes a welding robot 19 which serves as a torch moving mechanism and which includes a torch 17 provided on a tip shaft, and a filler metal feeding unit 21 for feeding a filler metal (welding wire) Fm to the torch 17.

The welding robot 19 is an articulated robot which has, for example, degrees of freedom on 6 axes, and in the torch 17 attached to the tip shaft of a robot arm, the filler metal Fm is supported such that the filler metal Fm can be continuously fed. The position or posture of the torch 17 can be three-dimensionally desirably set within the range of the degree of freedom of the robot arm.

The torch 17 generates an arc from a tip of the filler metal Fm in a shielding gas atmosphere, while holding the filler metal Fm. The torch 17 includes a shield nozzle (not illustrated), and shielding gas is supplied from the shield nozzle. The arc welding method may be either a consumable electrode type such as shielded metal arc welding or carbon dioxide gas arc welding, or a non-consumable electrode type such as TIG welding or plasma arc welding. The arc welding method is appropriately selected depending on the additively-manufactured object to be manufactured. For example, in the case of the consumable electrode type, a contact tip is disposed inside the shield nozzle, and the filler metal Fm to which a melting current is to be supplied is held on the contact tip.

Any commercially available welding wire can be used as the filler metal Fm. For example, wires provided as MAG welding and MIG welding solid wires (JIS Z 3312) for mild steel, high tensile steel and cryogenic steel, and arc welding flux cored wires (JIS Z 3313) for mild steel, high tensile steel and cryogenic steel can be used as the filler metal Fm.

The filler metal Fm is fed from the filler metal supply unit 21 to the torch 17 by a drawing mechanism (not illustrated) attached to a robot arm or the like. Further, by a command from the building controller 13, the welding robot 19 melts and solidifies the continuously fed filler metal Fm while moving the torch 17. As a result, a bead which is a molten and solidified body of the filler metal Fm is formed. Here, as described in detail later, the case where a blade 27 formed of a bead is formed on a shaft body 25 supported by a base material 23 will be described as an example.

A heat source for melting the filler metal Fm is not limited to the above-described arc. A heat source by means of other methods such as a heating method using an arc and a laser together, a heating method using plasma, and a heating method using an electron beam or a laser may be used. In the case of using an arc, the bead can be easily formed regardless of a raw material and a structure while a shielding property is ensured. In the case of heating with an electron beam or a laser, a heating amount can be controlled more finely, and a state of a weld bead can be maintained more suitably to contribute to further improvement in quality of the additively-manufactured object.

The building controller 13 includes a welding direction determination unit 31, a program generation unit 33, a storage unit 35, and a control unit 37 to which these are connected. Three-dimensional model data (such as CAD data) representing a shape of the additively-manufactured object to be produced and various kinds of instruction information are input from an input unit 39 to the control unit 37.

As described in detail later, the welding direction determination unit 31 generates a bead map (details will be described later) including position information for forming beads by using the input three-dimensional model data of the additively-manufactured object. The generated bead map is stored in the storage unit 35.

By using the above-described bead map, the program generation unit 33 generates a program that drives the building unit 11 to set a building procedure of the additively-manufactured object, and causes a computer to execute the procedure. The generated program is stored in the storage unit 35.

In the storage unit 35, specification information such as various driving units and movable ranges of the building unit 11 is also stored, and information is appropriately referred to when a program is generated by the program generation unit 33 or when the program is executed. The storage unit 35 includes a storage medium such as a memory or a hard disk, and can input and output various kinds of information.

The building controller 13 including the control unit 37 is a computer device including a CPU, a memory, an I/O interface, and the like, and has a function of reading data and a program stored in the storage unit 35 and executing data processing and the program, and a function of driving control of each unit of the building unit 11. The control unit 37 reads a program from the storage unit 35 and executes the program in response to instructions by operation, communication, or the like from the input unit 39.

When the control unit 37 executes the program, the welding robot 19, the power supply device 15, and the like are driven in accordance with a programmed predetermined procedure. The welding robot 19 moves the torch 17 along a programmed track trajectory in accordance with instructions from the building controller 13, and melts the filler metal Fm by an arc at a predetermined timing to form beads at a desired position.

The welding direction determination unit 31 and the program generation unit 33 are provided in the building controller 13, but the configuration is not limited thereto. Although not illustrated, for example, the welding direction determination unit 31 and the program generation unit 33 may be provided in an external computer such as a server or a terminal disposed separately from the manufacturing apparatus 100 for the additively-manufactured object via a communication unit such as a network or a storage medium. By connecting the welding direction determination unit 31 and the program generation unit 33 to the external computer, the bead map and the program can be generated without the manufacturing apparatus 100 for the additively-manufactured object, and program generation work does not become complex. Further, by transferring the generated bead map and program to the storage unit 35 of the building controller 13, it is possible to cause the generated bead map and program to operate in the same manner as in the case where the bead map and the program are generated by the building controller 13.

FIG. 2 is a perspective view of the additively-manufactured object 41.

The additively-manufactured object 41 shown as an example has a columnar shaft body 25, and a plurality (six in the illustrated example) of spiral blades 27 protruding radially outward in an outer circumference of the shaft body 25. The plurality of blades 27 have a screw shape in which the blades 27 are provided at the same interval along the circumferential direction at an axially intermediate portion of the shaft body 25.

In the manufacturing apparatus 100 for the additively-manufactured object shown in FIG. 1, an entire shape is not formed by an additive manufacturing method when the additively-manufactured object 41 is built, the shaft body 25 may be formed using a blank such as a bar, and the blade 27 may be formed by the additive manufacturing method. In this case, the shaft body 25 of the additively-manufactured object 41 is formed by a blank, and the blade 27 formed on the outer circumference of the shaft body 25 is additively manufactured by a bead. Thus, the number of manufacturing hours of the additively-manufactured object 41 can be greatly reduced.

Next, a basic lamination procedure of the additively-manufactured object as an example will be described.

Figure 3:
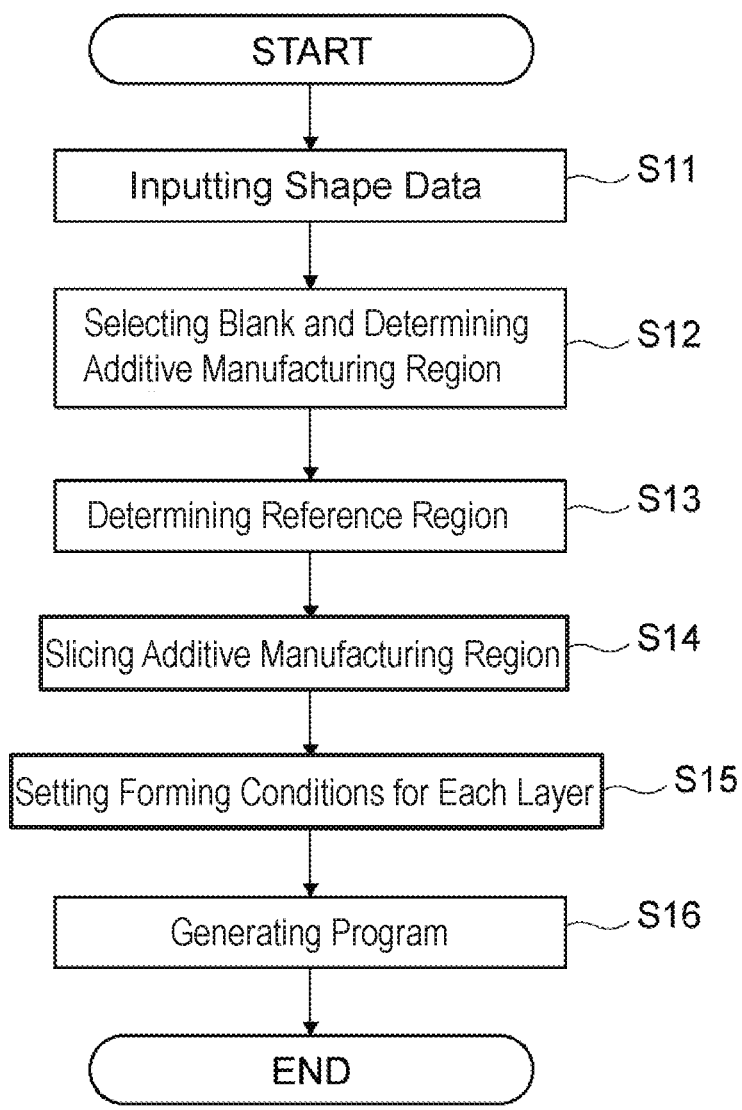
FIG. 3 is a flow chart showing a procedure until generating a program for designing a deposition of the additively-manufactured object and building the additively-manufactured object under designed conditions.

FIG. 3 is a flow chart showing a procedure until generating a program for designing a deposition of the additively-manufactured object 41 and building the additively-manufactured object 41 under the designed conditions.

First, three-dimensional model data (hereinafter referred to as shape data) representing the shape of the additively-manufactured object 41 is input from the input unit 39 shown in FIG. 1 to the control unit 37 (SI 1). The shape data includes coordinates of an outer surface of the additively-manufactured object 41, dimension information such as a diameter or a shaft length of the shaft body 25, and information such as a kind of a material and final finishing to be referred to as necessary. A step of generating the following program is performed by the program generation unit 33.

Figure 4:
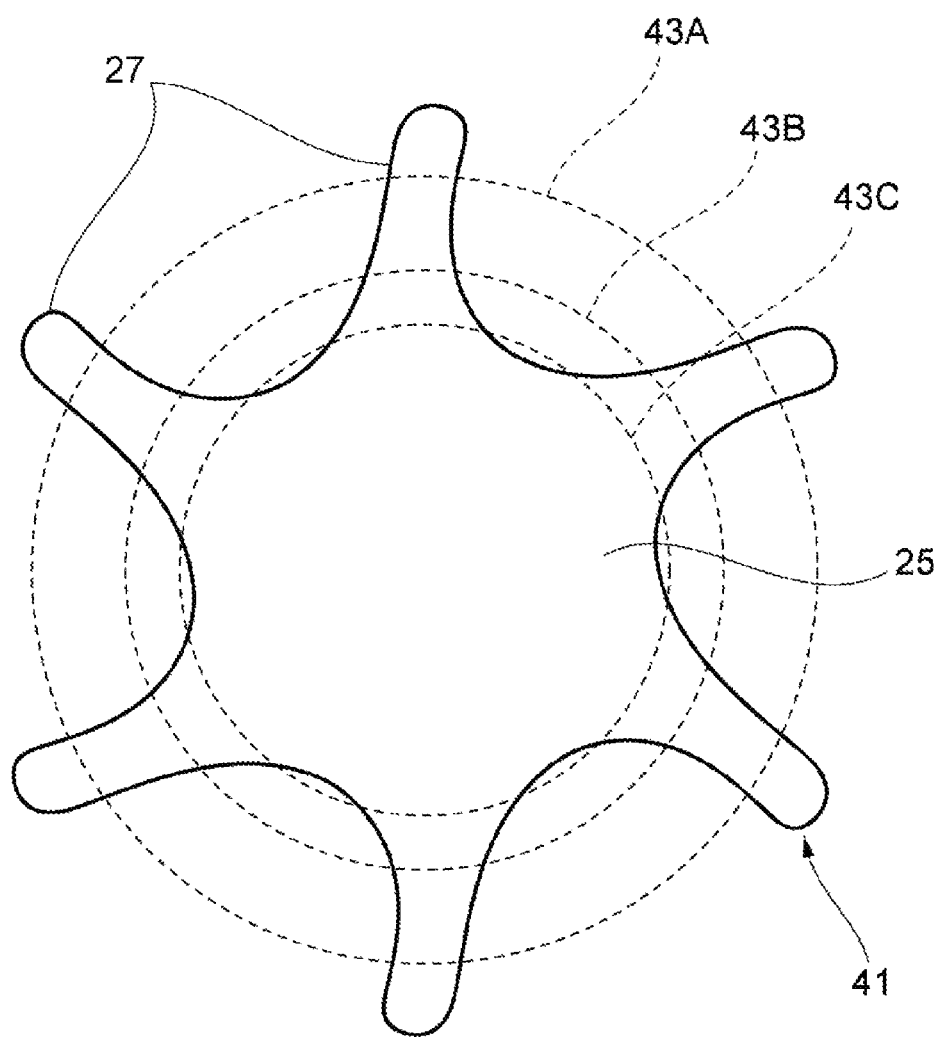
FIG. 4 is an explanatory view showing a state in which a blank region is determined in a cross section of the additively-manufactured object.

FIG. 4 is an explanatory view showing a state in which a blank region is determined in a cross section of the additively-manufactured object 41.

The additively-manufactured object 41 includes the columnar or cylindrical shaft body 25, and a plurality of blades 27 are erected from the outer circumferential surface of the shaft body 25. Therefore, by using the input shape data, the outer shape of the additively-manufactured object 41 is divided into a blank region to serve as a base of the additively-manufactured object 41 and an additive manufacturing region to serve as an outer shape of the additively-manufactured object 41 formed on the base.

The blank region and the additive manufacturing region are determined depending on the shape data of the additively-manufactured object 41 and the kind of the blank that can be prepared. In the case of the additively-manufactured object 41 of the illustrated example, among the blanks (round bars) 43A, 43B, and 43C shown as an example, the blank 43C having a diameter that minimizes a cutting amount for matching the shape of the additively-manufactured object 41 is selected.

Figure 5:
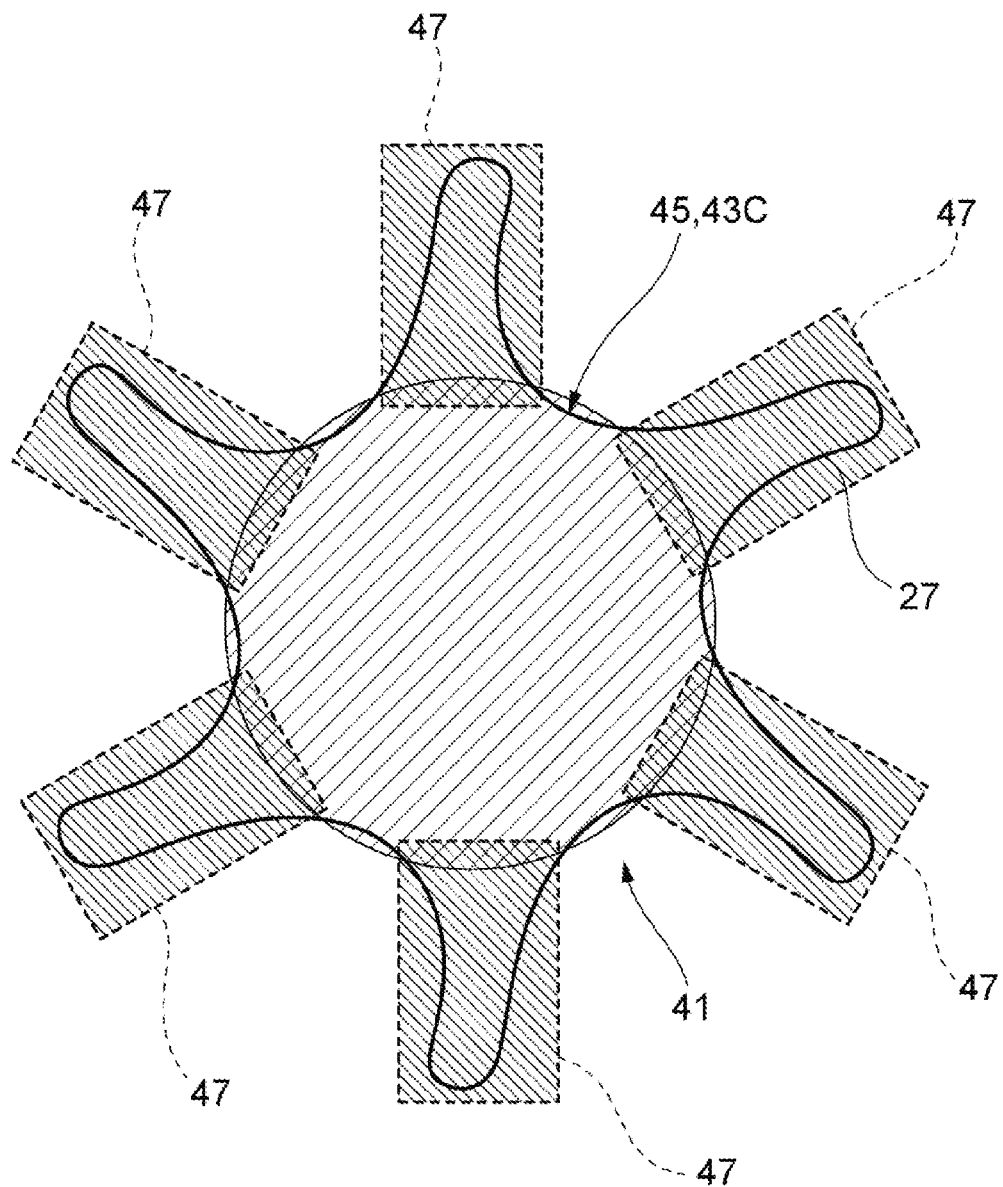
FIG. 5 is an explanatory view showing a result of dividing an outer shape of the additively-manufactured object into a blank region and an additive manufacturing region.

FIG. 5 is an explanatory view showing a result of dividing an outer shape of the additively-manufactured object 41 into a blank region 45 and an additive manufacturing region 47.

In the case of this example, the blank 43C is the blank region 45, and each of the plurality of blades 27 disposed on outer circumference of the blank 43C is the additive manufacturing region 47 (S12).

Next, a procedure for forming beads in the additive manufacturing region 47 determined in the above S12 is determined.

In the additive manufacturing region 47, a plurality of beads are deposited in turn to build a rough shape of the blade 27. A bead size such as a bead width and a bead height of the individual beads constituting the additive manufacturing region 47 is controlled by changing welding conditions such as a moving speed of the torch 17 (see FIG. 1), namely a continuous formation speed of beads, an amount of heat input to filler metal and a welding unit such as a welding current, a welding voltage, and an applied pulse from the power supply device 15. The bead size is preferably managed in a cross section perpendicular to a moving direction of the torch for forming the weld beads.

Figure 6:
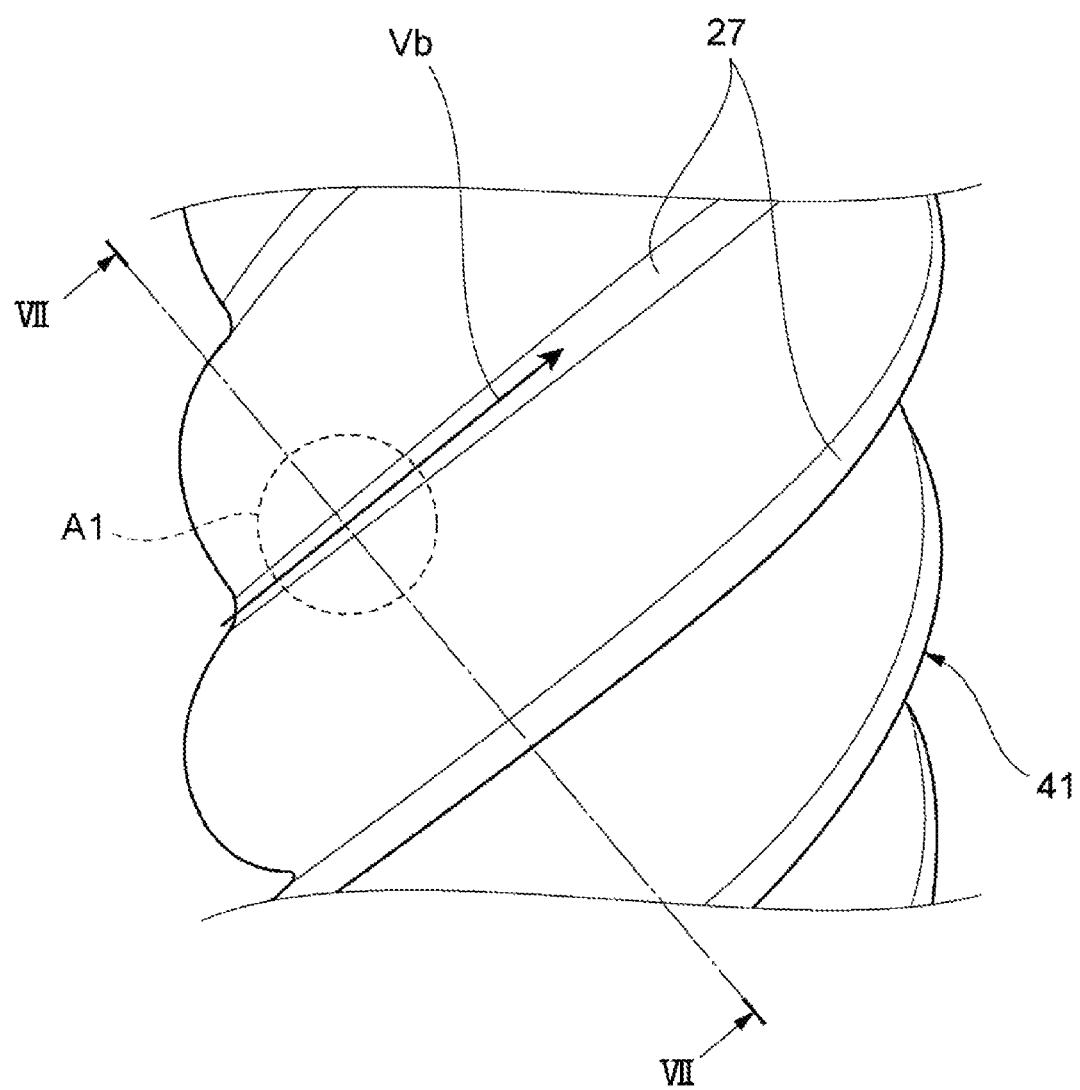
FIG. 6 is a partial front view of the additively-manufactured object.

FIG. 6 is a partial front view of the additively-manufactured object 41.

In the additively-manufactured object 41 having the configuration, the continuous formation length of each weld bead can be increased when the extending direction in which the spiral blade 27 is provided to extend is made to correspond to the continuous formation direction Vb of the weld bead. Therefore, the bead forming direction Vb is the same as the extending direction of the spiral blade 27 and is set as a reference direction (S13). Thus, the bead size is controlled based on a shape of a bead cross section indicated by a VII-VII line cross section perpendicular to the reference direction (bead forming direction Vb).

For example, in the additively-manufactured object having at least one protrusion continuous in a specific direction, if the weld beads are formed along the continuous specific direction, deposition can be efficiently performed, and complication of the additive manufacturing step is reduced. Therefore, first, the specific direction in which the additively-manufactured object is continuous is determined from the shape data of the additively-manufactured object to be manufactured. The specific direction may be determined by analyzing the shape data with an appropriate algorithm by operation of a computer, or may be determined artificially, for example, by judgement of a worker.

Figure 7:
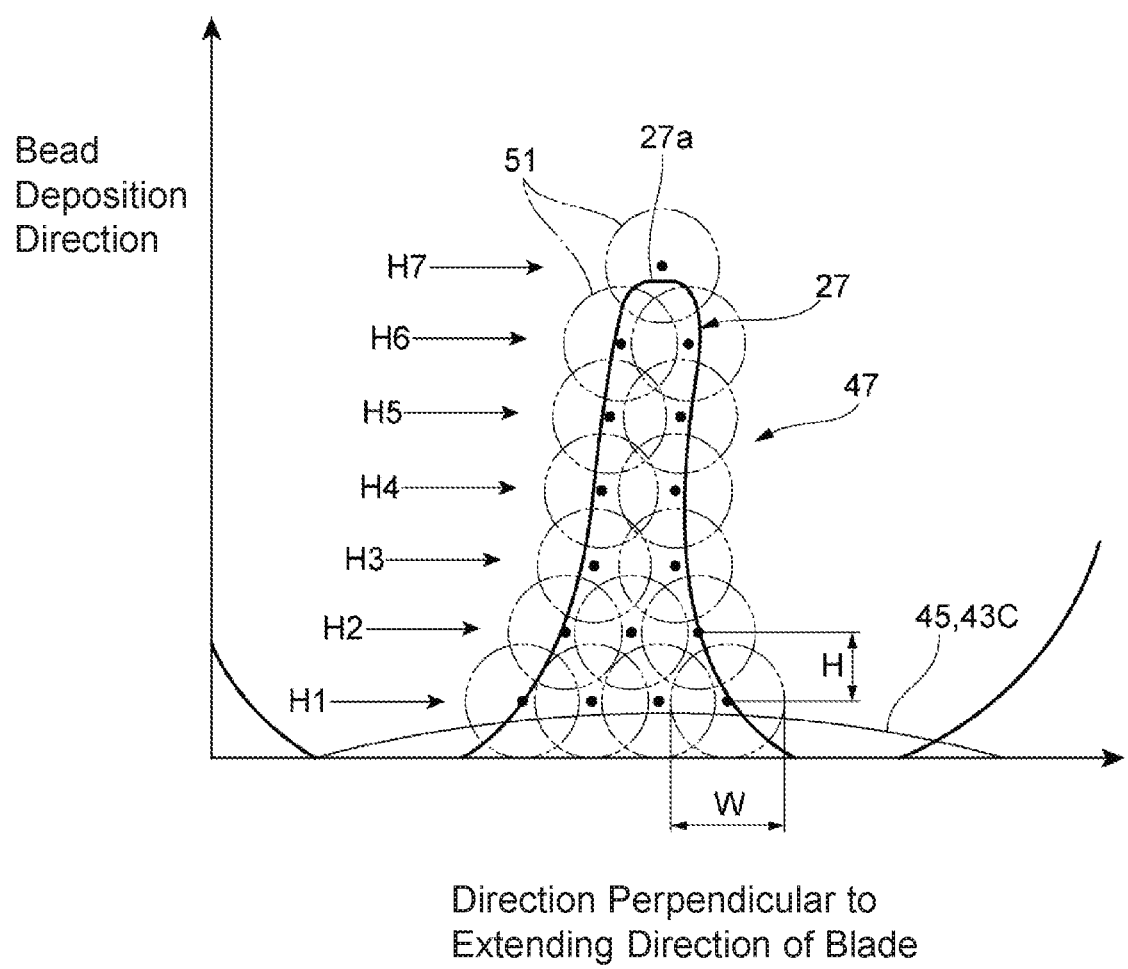
FIG. 7 is a cross-sectional view of a part A1 taken along a line VI-VII shown in FIG. 6.

FIG. 7 is a cross-sectional view of a part A1 taken along a line VII-VII shown in FIG. 6. A horizontal axis in the drawing is a direction perpendicular to the extending direction (reference direction) of the blade 27, and a vertical axis is a bead deposition direction which is a radial direction of the shaft body 25.

Here, the additive manufacturing region 47 of the blade 27 is sliced into a plurality of imaginary bead layers (S14). Beads (shown as imaginary beads 51) of the plurality of imaginary bead layer are disposed such that a final shape of the blade 27 is included depending on a bead height H of one layer of the imaginary bead layer. The illustrated example shows a case where the imaginary beads 51 shown by a dotted line are deposited in order (layers H1, H2, . . . ) from the surface of the shaft body 25 (blank 43C), and a radially outermost edge portion 27a of the blade 27 is covered in the seventh layer (layer H7). That is, here, a deposition model having seven imaginary bead layers in total is obtained.

The deposition model is generated for all of the plurality of additive manufacturing regions 47 shown in FIG. 5. Then, in each lamination model, the bead size is designed in a common cross section. That is, various conditions such as a disposing position (bead lamination height H or the like), a bead size (a bead width W or the like), and welding conditions of the imaginary bead 51 are set (S15) in each imaginary bead layer of the additive manufacturing region 47. Although the number of the divided imaginary bead layers is seven in FIG. 7, the number of divided layers can be desirably set depending on the bead size, the size and shape of the additively-manufactured object, and the like.

Next, a program indicating a procedure for forming beads on the blank 43C in accordance with the deposition model designed as described above is generated (S16). The program generation unit 33 shown in FIG. 1 generates the program.

The program referred to here is an instruction code for causing the building unit 11 to perform a bead forming procedure designed by a predetermined operation from input shape data of the additively-manufactured object. The control unit 37 specifies an appropriate program from programs prepared in advance and executes the specified program, thereby manufacturing the additively-manufactured object 41 by the building unit 11. That is, the control unit 37 reads an appropriate program from the storage unit 35, forms beads in accordance with the program, and builds the additively-manufactured object 41.

Figure 8:
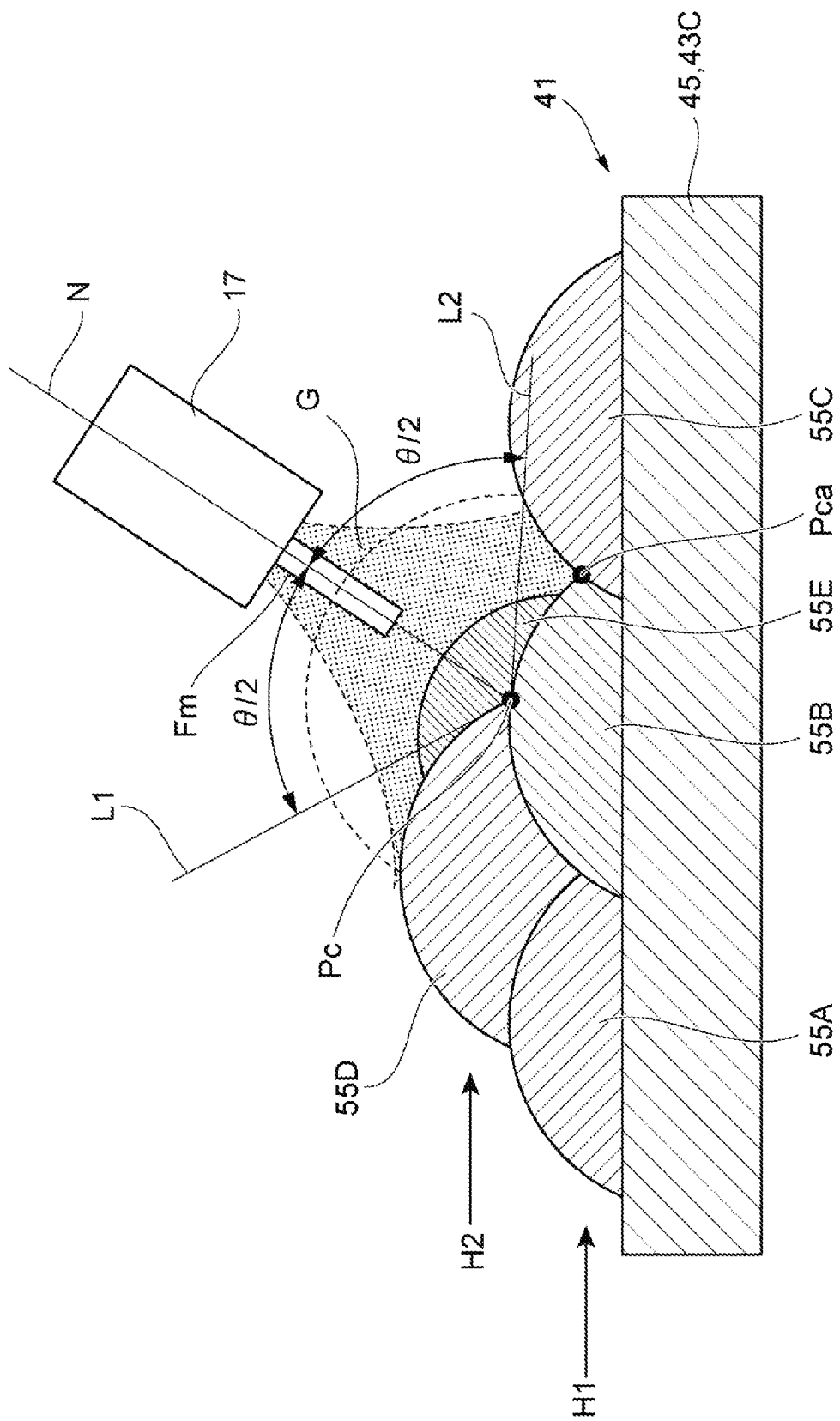
FIG. 8 is a step explanatory view for schematically showing a state in which beads are formed.

FIG. 8 is a step explanatory diagram schematically showing a state in which beads are formed.

The building controller 13 (see FIG. 1) drives the building unit 11 in accordance with the generated program, arranges beads 55A, 55B, 55C . . . in order on the blank 43C of the additively-manufactured object 41, thereby forming a bead layer of the first layer (layer H1). Then, beads 55D, 55E, . . . of the second layer (layer H2) are arranged in order on the first bead layer (layer H).

Here, a boundary between an outer surface of the bead 55D and an outer surface of the bead 55B is set as Pc (a boundary on a right side in the drawing of the bead 55D), and a tangent of the outer surface of the bead 55D at the boundary Pc is set as L1, and a tangent of the outer surface of the bead 55B at the boundary Pc is set as L2. An angle formed between the tangents L1 and L2 is set as a, and a bisector of the angle α is set as N.

The next bead 55E adjacent to the bead 55D is formed in the boundary Pc as a target position. In forming the bead 55E, a direction of a torch axis of the torch 17 is set in the substantially same direction as a straight line N. A target position at which the bead 55E is formed is not limited to the boundary Pc, but may be a boundary Pca between the bead 55B and the bead 55C.

In forming the beads 55A to 55E . . . , the building controller 13 moves the torch 17 toward a back side in the drawing (a vertical direction to paper) in accordance with the program described above and heats the vicinity of the target position of bead formation by the arc generated in a shielding gas G atmosphere. Then, the molten filler metal Fm is solidified at the target position by heating to form a new bead. As a result, a bead layer having a rough shape shown in FIG. 7 is formed. The additive manufacturing region 47 in which the bead layer is formed is finished into a desired shape of the blade 27 by appropriate processing thereafter.

Here, in the present embodiment, the additive manufacturing procedure of the additively-manufactured object to be additively manufactured by beads by driving the building unit 11 of the manufacturing apparatus 100 for the additively-manufactured object is designed through a slicing step, a surface dividing step, a continuous line extracting step, an extension direction estimating step, and a bead formation line determining step.

Hereinafter, a specific design method of the additive manufacturing procedure will be described for each step.

Figure 9B:
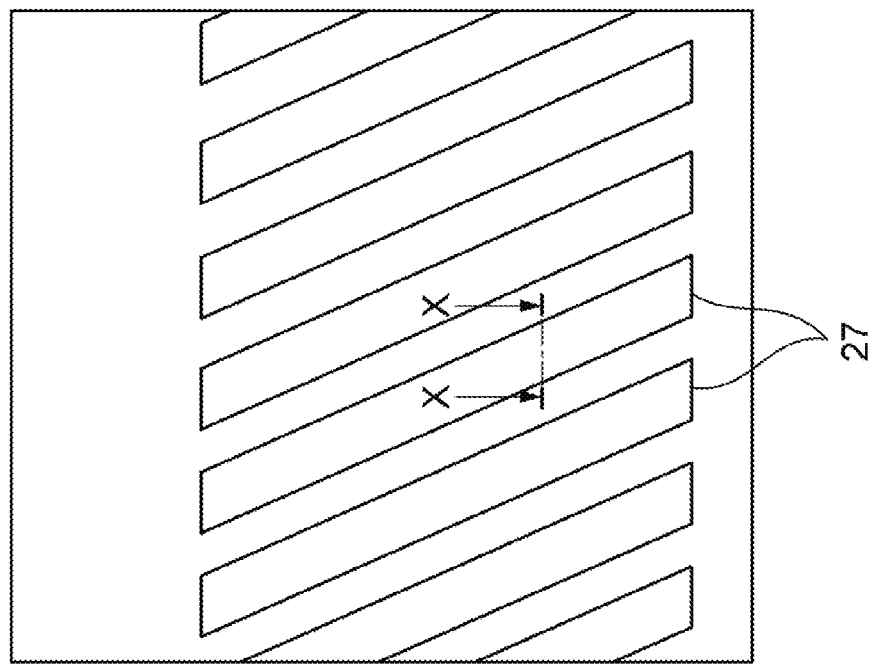
FIG. 9A and FIG. 9B illustrate a method for designing an additive manufacturing procedure according to the present embodiment.
Figure 9A:
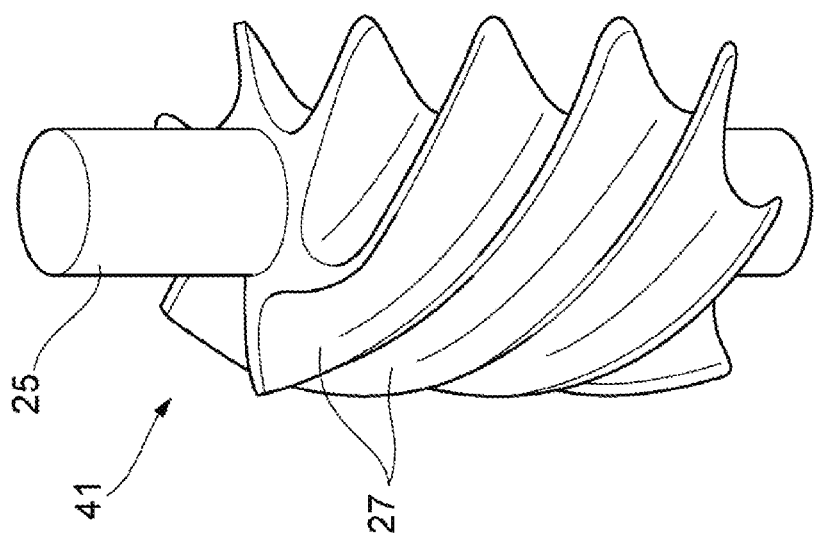
Figure 11:
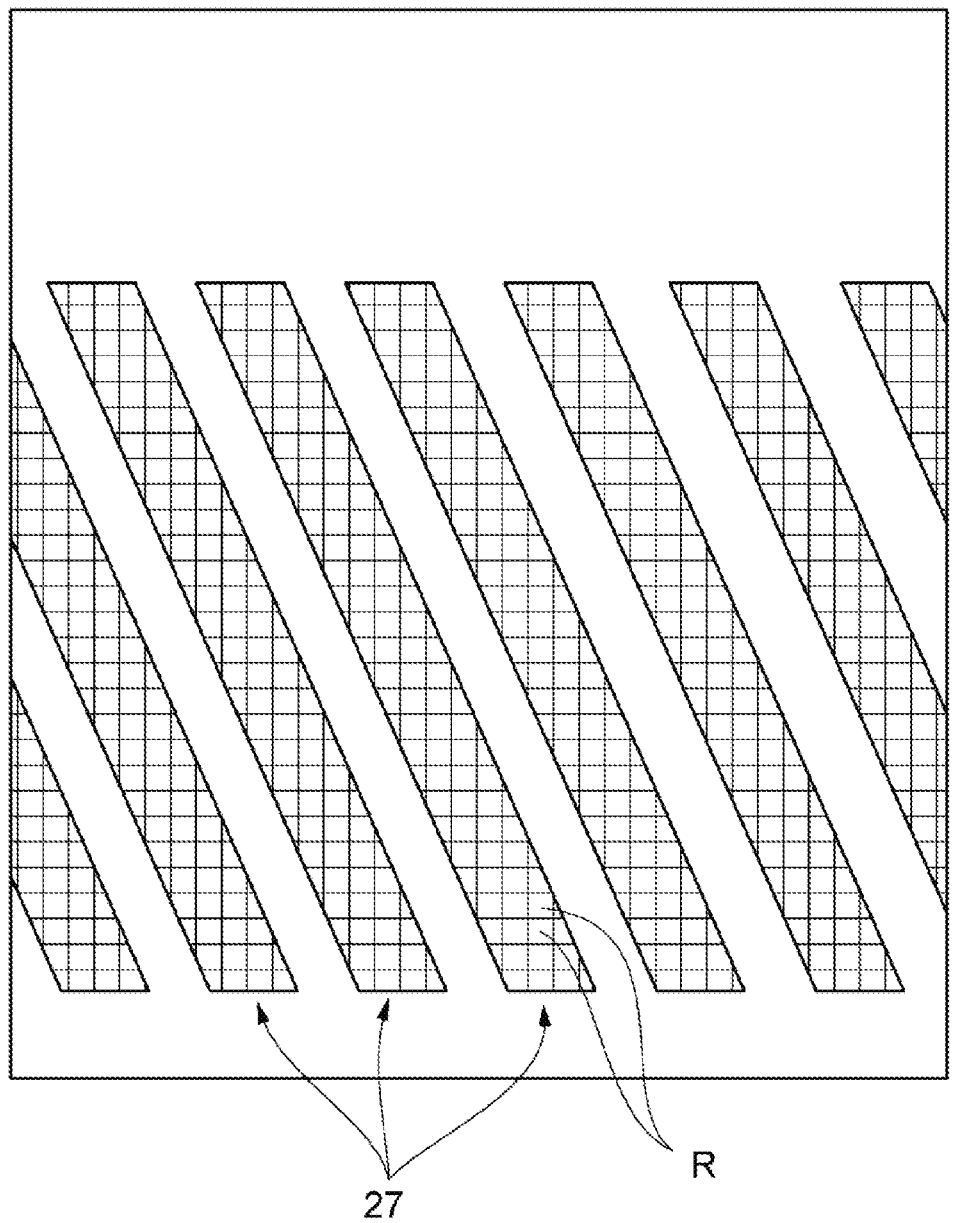
FIG. 11 is a developed view of the additively-manufactured object showing a state in which a first layer of a sliced blade is divided in the surface.
Figure 12:
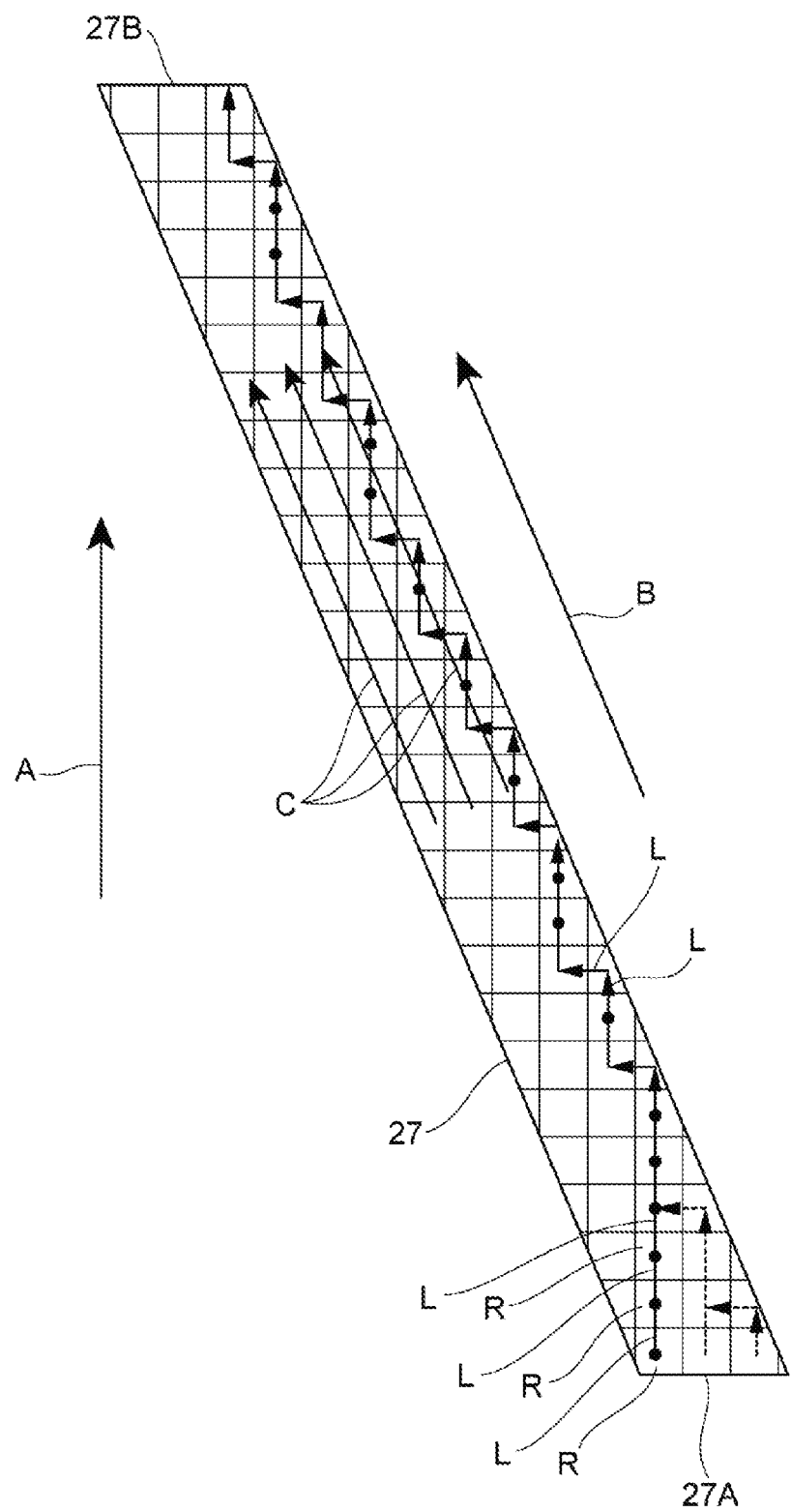
FIG. 12 is a developed view of a blade after dividing the first layer of the sliced blade in the surface.

FIG. 9A and FIG. 9B illustrate a method for designing the additive manufacturing procedure according to the present embodiment. FIG. 9A is a perspective view of the additively-manufactured object, and FIG. 9B is a developed view of the additively-manufactured object. FIG. 10 is a cross-sectional view taken along a line X-X in FIG. 9B. FIG. 11 is a developed view of the additively-manufactured object showing a state in which a first layer of a sliced blade is divided in the surface. FIG. 12 is a developed view of one blade obtained by dividing the first layer of the sliced blade in the surface.

(Slicing Step)

The shape of the additively-manufactured object 41 is sliced into a plurality of layers depending on the height of the bead by use of three-dimensional shape data of the additively-manufactured object. As shown in FIG. 9A, when the additively-manufactured object 41 having a plurality of blades 27 is developed, as shown in FIG. 9B, the blades 27 are aligned obliquely. In this developed view, when a cross section of the blade 27 is viewed in a direction perpendicular to the axis of the shaft body 25, as shown in FIG. 10, the blade 27 has a shape erected from a base material including the shaft body 25. In the slicing step, the blade 27 is sliced into a plurality of layers depending on the height of the bead by use of the three-dimensional shape data of the additively-manufactured object 41. In this example, the blade 27 is sliced into seven layers of H1 to H7

(Surface Dividing Step)

A shape of each of the divided layers H1 to H7 is divided into a plurality of regions R each including a polygon surface. FIG. 11 shows a planar shape of the first layer H1 of the blade 27 in the developed view. The shape of the first layer H1 is divided into a plurality of regions Reach including a polygon surface. Here, a planar shape of the first layer H1 of the blade 27 is divided into a plurality of regions R including polygon surfaces in which the polygon surfaces have basically quadrangular shape.

(Connection Line Extracting Step)

In each layer, a connection line connecting adjacent regions R is obtained from one end portion 27A to the other end portion 27B of the blade 27. For example, as shown in FIG. 12, one region R in one end portion 27A of the blade 27 is arbitrarily selected. Here, a left end region R of one end portion 27A of the blade 27 is selected. Next, an adjacent region R in a preset set direction A is selected, and a connection line L connecting central positions of the regions R is obtained. After that, the connection line L connecting central positions of the regions R adjacent in the set direction A is obtained in order. If there is no region R adjacent in the set direction A since the set direction A side of the region R is an edge portion of the blade 27, the region R adjacent to the left side is selected, and the connection lines L connecting the respective central positions are obtained. Although the region R adjacent to the left side is selected here, a region adjacent to the right side may be selected depending on the shape of the layer.

The region R selected by the one end portion 27A of the blade 27 is not limited to a left end and may be a center or a right end, and in either case, the obtained connection line L follows the same route thereafter (see dotted lines in FIG. 12).

(Extension Direction Estimating Step)

From the extracted connection line L, an extension direction B of the blade 27 in which beads are to be formed is obtained by, for example, a least square method or the like.

(Bead Formation Line Determining Step)

The divided layer of the blade 27 is divided into a plurality of beads along the estimated extension direction B to determine formation projected lines C for forming the respective beads.

Then, the formation projected lines C are determined in all the layers H1 to H7 of the blade 27, and the beads 55 are formed along the determined formation projected lines C.

In this way, according to the above embodiment, regions R are applied to each of the layers H1 to H7 of the blade 27 which is the additively-manufactured object sliced into a plurality of layers and each of the layers is divided, the extension direction B is determined by determining the connection line L connecting the regions R, and the formation projected line C of the beads is determined along the extension direction B. Specifically, the shape of each of the layers H1 to H7 of the blade 27 is divided into a plurality of regions Reach including a polygon surface to obtain the connection line L and determine the extension direction B, and the formation projected line C of the beads is determined along the extension direction. As a result, a formation direction in forming the beads can be appropriately and easily determined, and additive manufacturing can be efficiently performed in an optimal building procedure.

In the above embodiment, in the surface dividing step, the planar shape of the blade 27 in each of the layers H1 to H7 is divided into regions R each including a quadrangular polygon surface, but the shape of the region R is not limited to a quadrangle.

Figure 13:
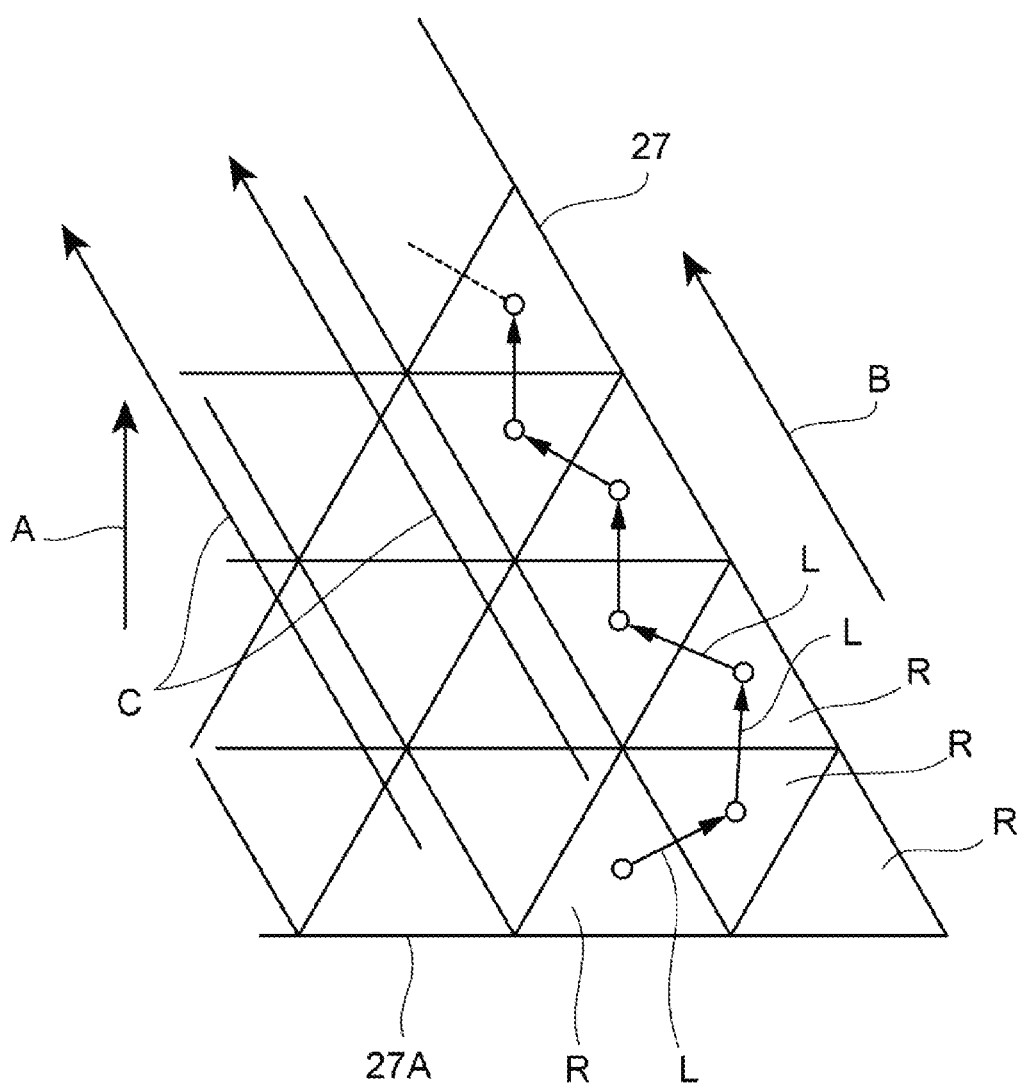
FIG. 13 is a developed view of a part of a blade obtained by dividing a shape of the first layer of the blade in the surface into regions formed by triangular polygon surfaces.

FIG. 13 is a developed view of a part of a blade obtained by dividing a shape of the first layer of the blade in the surface into regions including a triangular polygon surface.

As shown in FIG. 13, in the surface dividing step, the planar shape of the blade 27 in each of the layers H1 to H7 may be divided into regions R each including a triangular polygon surface. Here, the connection line extracting step in a case of dividing by the region R including a triangular polygon surface is described.

In the case of dividing into regions R including a triangular polygon surface, priority of selection of a proceeding direction of the connection line L is set to, for example, up, right, left, and the connection line L connecting adjacent regions R is obtained. Specifically, one region R in the one end portion 27A of the blade 27 is arbitrarily selected, the region R (a region adjacent to the right side here) adjacent in the preset set direction A is selected, and the connection line L connecting the central positions of the regions R is obtained. At this time, if there is no region R adjacent in the set direction A, the adjacent regions R is selected along the priority of selection of the proceeding direction. Processing of determining the connection line L is repeatedly performed.

Thereafter, the extension direction B of the blade 27 in which beads are to be formed is obtained from the extracted connection line L (extension direction estimating step), and the formation projected lines C for forming each bead is determined by dividing the layer of the divided blade 27 into a plurality of beads along the estimated extension direction B (bead formation line determining step).

Next, modification examples of a method of determining the extension direction will be described.

Figure 14:
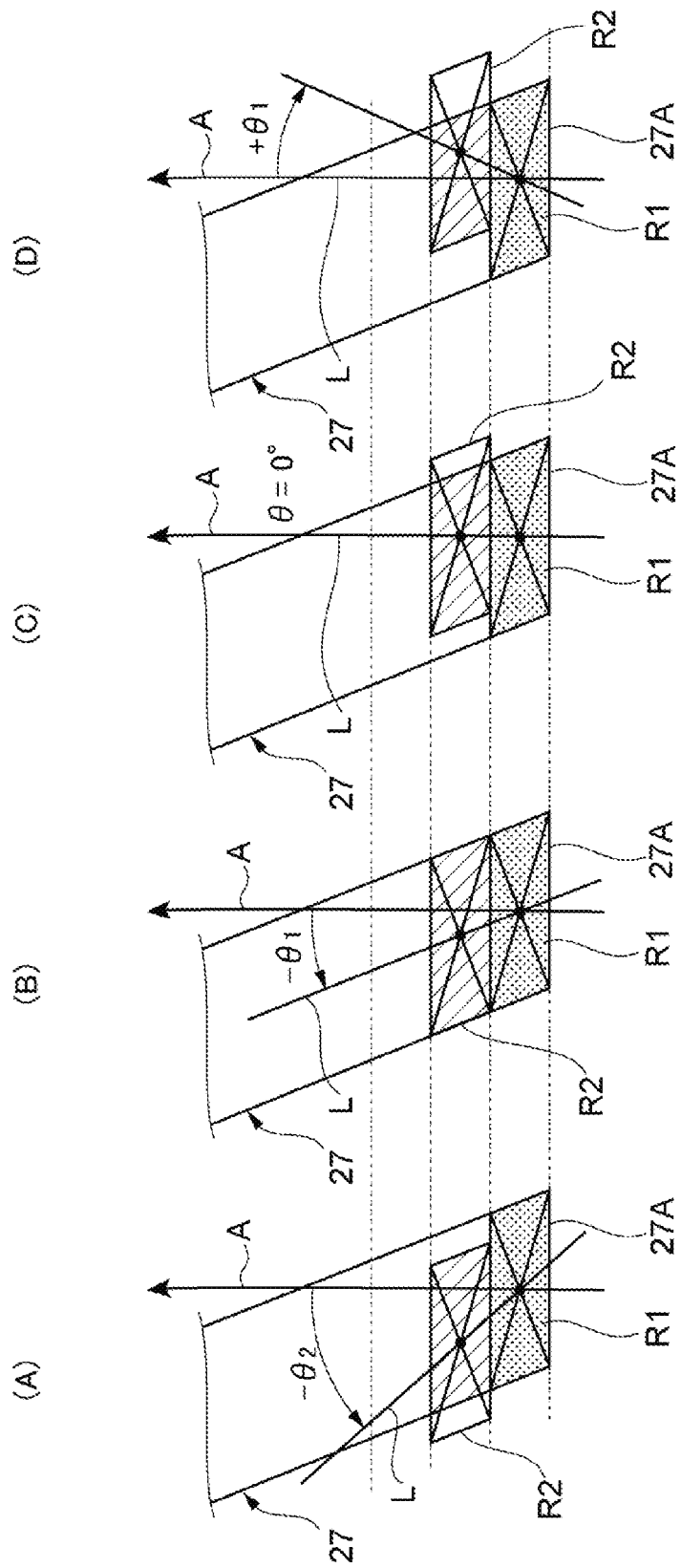
FIG. 14 illustrates modified examples of a method of determining an extension direction, and (A) to (D) of FIG. 14 are schematic diagrams of a blade illustrating methods of surface division of the blade respectively.
Figure 15:
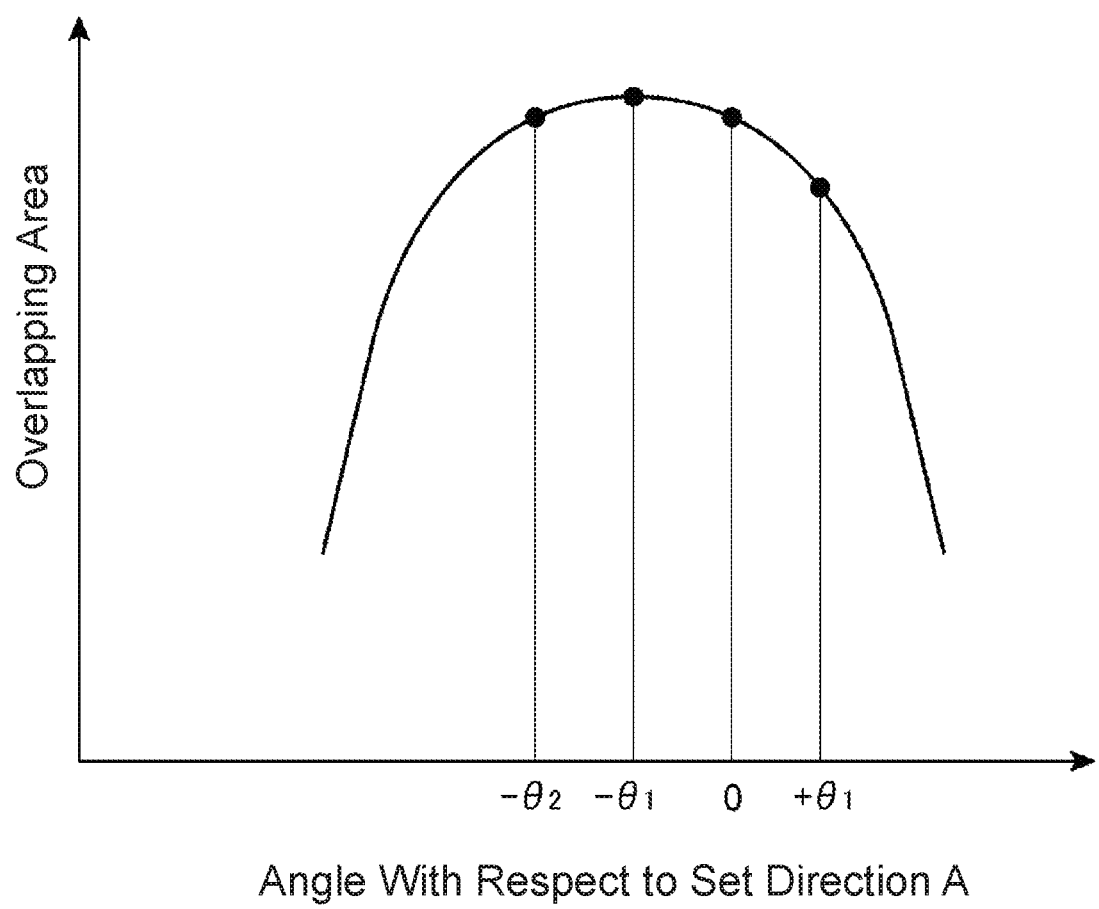
FIG. 15 is a graph illustrating a method of selecting the extension direction.

FIG. 14 illustrates a modification example of a method of determining an extension direction, and (A) to (D) of FIG. 14 are schematic diagrams of a blade illustrating methods of surface division of the blade respectively. FIG. 15 is a graph illustrating a method of selecting the extension direction.

In the modification example, in the surface dividing step, when a region R having a preset set shape is applied to the sliced layer and the set shape is applied in a part adjacent to the applied region R, regions R are set such that an area S of a surface in contact with the already applied region R becomes maximum.

FIG. 14 shows a case in which a region R having a set shape (parallelogram) is applied to the blade 27 at the one end portion 27A, and a region R2 having the same set shape is applied to a part adjacent to the region R1. In (A) of FIG. 14, a central position of the region R2 of the adjacent part largely deviates to the left side with respect to a central position of the region R1 on the one end portion 27A, and an inclination angle of the connection line L with respect to the set direction A is $-\theta_2$. In (B) of FIG. 14, the central position of the region R2 of the adjacent part deviates to the left side with respect to the central position of the region R1 on the one end portion 27A, and an inclination angle of the connection line L with respect to the set direction A is $-\theta_1$. In (C) of FIG. 14, the connection line L connecting the central position of the region R1 on the one end portion 27A and the central position of the region R2 of the adjacent part coincides with the set direction A. In (D) of FIG. 14, the central position of the region R2 of the adjacent part to deviates to the right side with respect to the central position of the region R1 on the one end portion 27A, and an inclination angle of the connection line L with respect to the set direction A is $+\theta_1$.

In such a case, as shown in FIG. 15, the area S of a contact surface between the regions R1 and R2 adjacent to each other becomes maximum when the inclination angle of the connection line L with respect to the set direction A is $-\theta_1$. In this case, the surface is divided such that the inclination angle of the connection line L between the regions R1 and R2 is set as $-\theta_1$ with respect to the set direction A. and the extension direction B of the blade 27 is obtained from the connection line L. The inclination angle of the connection line L in which the area S becomes maximum can be analytically obtained from a fitting curve connecting plotted points shown in FIG. 15.

In the modification example, when the region R having a preset set shape is applied to the shape of the layers H1 to H7 of the blade 27 which is the additively-manufactured object and a region R having the set shape is applied in a part adjacent to the applied region R, the region R is set such that an area of a surface of the region R in contact with the already applied region R becomes maximum. Then, the extension direction B can be determined by determining the connection line L of each region R, and the formation projected line C of the beads can be appropriately and easily determined along the extension direction B.

The present invention is not limited to the above-mentioned embodiment, and a combination of configurations in the embodiment, and modifications and applications made by one skilled in the art based on description in the specification and common techniques, are also intended in the present invention and included within the scope of protection claimed.

Although a spiral blade is used as the additively-manufactured object in description of the above embodiment, an object to be built of the present invention is not limited thereto and can be applied to any objects such as other mechanical structures or mechanical components.

As described above, the present specification discloses the following matters.

(1) A method for manufacturing an additively-manufactured object in which an additively-manufactured object including a protrusion extending in one direction is built by beads formed by melting and solidifying a filler metal, the method including:

a slicing step of slicing a shape of the additively-manufactured object into a plurality of layers depending on a height of the beads by using three-dimensional shape data of the additively-manufactured object;

a surface dividing step of dividing each of the layers into a plurality of regions by applying a region having a preset set shape to each of the sliced layers;

a connection line extracting step of determining a connection line connecting the adjacent regions with each other from one end portion to the other end portion of the protrusion;

an extension direction estimating step of determining an extension direction of the protrusion based on the connection line;

a bead formation line determining step of determining a formation projected line of the beads by dividing the sliced layers into a plurality of the beads along the extension direction; and a building step of building the additively-manufactured object by forming the beads along the formation projected line of the beads.

In the method for manufacturing the additively-manufactured object, the region is applied to each layer of the additively-manufactured object sliced into a plurality of layers and each of the layers is divided, the extension direction is determined by determining the connection line connecting the regions, and the formation projected line of the beads is determined along the extension direction. As a result, a formation direction in forming the beads can be appropriately and easily determined, and additive manufacturing can be efficiently performed in an optimal building procedure.

(2) The method for manufacturing an additively-manufactured object according to (1), in which in the surface dividing step, a shape of each of the sliced layers is divided into regions including a plurality of polygon surfaces.

In the method for manufacturing the additively-manufactured object, the extension direction can be determined by dividing the shape of each layer of the additively-manufactured object into regions including a plurality of polygon surfaces, and the formation projected line of the beads can be appropriately and easily determined along the extension direction.

(3) The method for manufacturing an additively-manufactured object according to (1), in which in the surface dividing step, a region having the preset set shape is applied to the sliced layer, and a region having the set shape is repeatedly applied to a part of the layer adjacent to the region, and a region to be applied next is selected such that an area of an overlap of the region and the part of the layer is maximum.

According to the manufacturing method of the additively-manufactured object, when the region of the preset set shape is applied to the shape of each layer of the additively-manufactured object and the region R of the set shape is applied in a part adjacent to the applied region, an area of a surface in contact with the already applied region becomes maximum. Then, the extension direction can be determined by determining the connection line of each region, and the formation projected line of the beads can be appropriately and easily determined along the extension direction.

(4) An apparatus for manufacturing an additively-manufactured object, including:

a control unit configured to determine a building procedure by the method for manufacturing an additively-manufactured object according to any one of (1) to (3); and a building unit configured to be driven in accordance with the building procedure determined by the control unit to form the beads.

With the apparatus for manufacturing an additively-manufactured object, the additively-manufactured object can be built with high efficiency.

(5) A program for causing a computer to determine a bead formation order in building additively-manufactured object by beads formed by melting and solidifying a filler metal using three-dimensional shape data of the additively-manufactured object including a protrusion extending in one direction, the program including:

a procedure of slicing a shape of the additively-manufactured object into a plurality of layers depending on a height of the beads by using three-dimensional shape data of the additively-manufactured object;

a procedure of dividing each of the layers into a plurality of regions by applying a region having a preset set shape to each of the sliced layers;

a procedure of determining a connection line connecting the adjacent regions from one end portion to the other end portion of the protrusion;

a procedure of determining an extension direction of the protrusion based on the connection line;

a procedure of determining a formation projected line of the beads by dividing the sliced layer into a plurality of the beads along the extension direction; and a procedure of determining the bead formation order of building the additively-manufactured object by forming the beads along the formation projected line of the beads.

In the program, the region is applied to each layer of the additively-manufactured object sliced into a plurality of layers and each of the layers is divided, the extension direction is determined by determining the connection line connecting the regions, and the formation projected line of the beads is determined along the extension direction. As a result, a formation direction in forming the beads can be appropriately and easily determined, and additive manufacturing can be efficiently performed in an optimal building procedure.

The present application is based on Japanese Patent Application No. 2018-95769 filed on May 17, 2018, the contents of which are incorporated as reference in the present application.

REFERENCE SIGNS LIST 13 building controller
17 torch
27 blade (protrusion)
31 welding direction determination unit
33 program generation unit
35 storage unit
37 control unit
41 additively-manufactured object
55A, 55B, 55C, 55D, 55E bead
B extension direction
C formation projected line
Fm filler metal
H1 to H7 layer
L connection line
R region

The invention claimed is:

1. A method for manufacturing an additively-manufactured object in which an additively-manufactured object comprising a protrusion extending in one direction is built by beads formed by melting and solidifying a filler metal, the method comprising:
   a slicing step of slicing a shape of the additively-manufactured object into a plurality of layers depending on a height of the beads by using three-dimensional shape data of the additively-manufactured object;
   a surface dividing step of dividing each of the layers into a plurality of regions by applying a region having a preset set shape to each of the sliced layers;
   a connection line extracting step of determining a connection line connecting the adjacent regions with each other from one end portion to the other end portion of the protrusion;
   an extension direction estimating step of determining an extension direction of the protrusion based on the connection line;
   a bead formation line determining step of determining a formation projected line of the beads by dividing the sliced layers into a plurality of the beads along the extension direction; and
   a building step of building the additively-manufactured object by forming the beads along the formation projected line of the beads.

2. The method for manufacturing an additively-manufactured object according to claim 1, wherein in the surface dividing step, a shape of each of the sliced layers is divided into regions including a plurality of polygon surfaces.

3. The method for manufacturing an additively-manufactured object according to claim 1, wherein in the surface dividing step, a region having the preset set shape is applied to the sliced layer, and a region having the set shape is repeatedly applied to a part of the layer adjacent to the region, and
   a region to be applied next is selected such that an area of an overlap of the region and the part of the layer is maximum.

4. An apparatus for manufacturing an additively-manufactured object, comprising:
   a control unit configured to determine a building procedure by the method for manufacturing an additively-manufactured object according to claim 1; and
   a building unit configured to be driven in accordance with the building procedure determined by the control unit to form the beads.

5. A computer program product comprising a non-transitory computer readable storage medium having instructions encoded thereon for causing a computer to determine a bead formation order in building additively-manufactured object by beads formed by melting and solidifying a filler metal using three-dimensional shape data of the additively-manufactured object comprising a protrusion extending in one direction, wherein the instructions, when executed by the computer, cause the computer to execute process, the process comprising:
   slicing a shape of the additively-manufactured object into a plurality of layers depending on a height of the beads by using three-dimensional shape data of the additively-manufactured object;
   dividing each of the layers into a plurality of regions by applying a region having a preset set shape to each of the sliced layers;
   determining a connection line connecting the adjacent regions from one end portion to the other end portion of the protrusion;
   determining an extension direction of the protrusion based on the connection line;
   determining a formation projected line of the beads by dividing the sliced layer into a plurality of the beads along the extension direction; and
   determining the bead formation order of building the additively-manufactured object by forming the beads along the formation projected line of the beads.

6. An apparatus for manufacturing an additively-manufactured object, comprising:
   a control unit configured to determine a building procedure by the method for manufacturing an additively-manufactured object according to claim 2; and
   a building unit configured to be driven in accordance with the building procedure determined by the control unit to form the beads.

7. An apparatus for manufacturing an additively-manufactured object, comprising:
   a control unit configured to determine a building procedure by the method for manufacturing an additively-manufactured object according to claim 3; and
   a building unit configured to be driven in accordance with the building procedure determined by the control unit to form the beads.

* * * * *